N. B. KRANGNESS.
DRAFT EQUALIZER.
APPLICATION FILED OCT. 27, 1909.
1,037,930.
Patented Sept. 10, 1912.
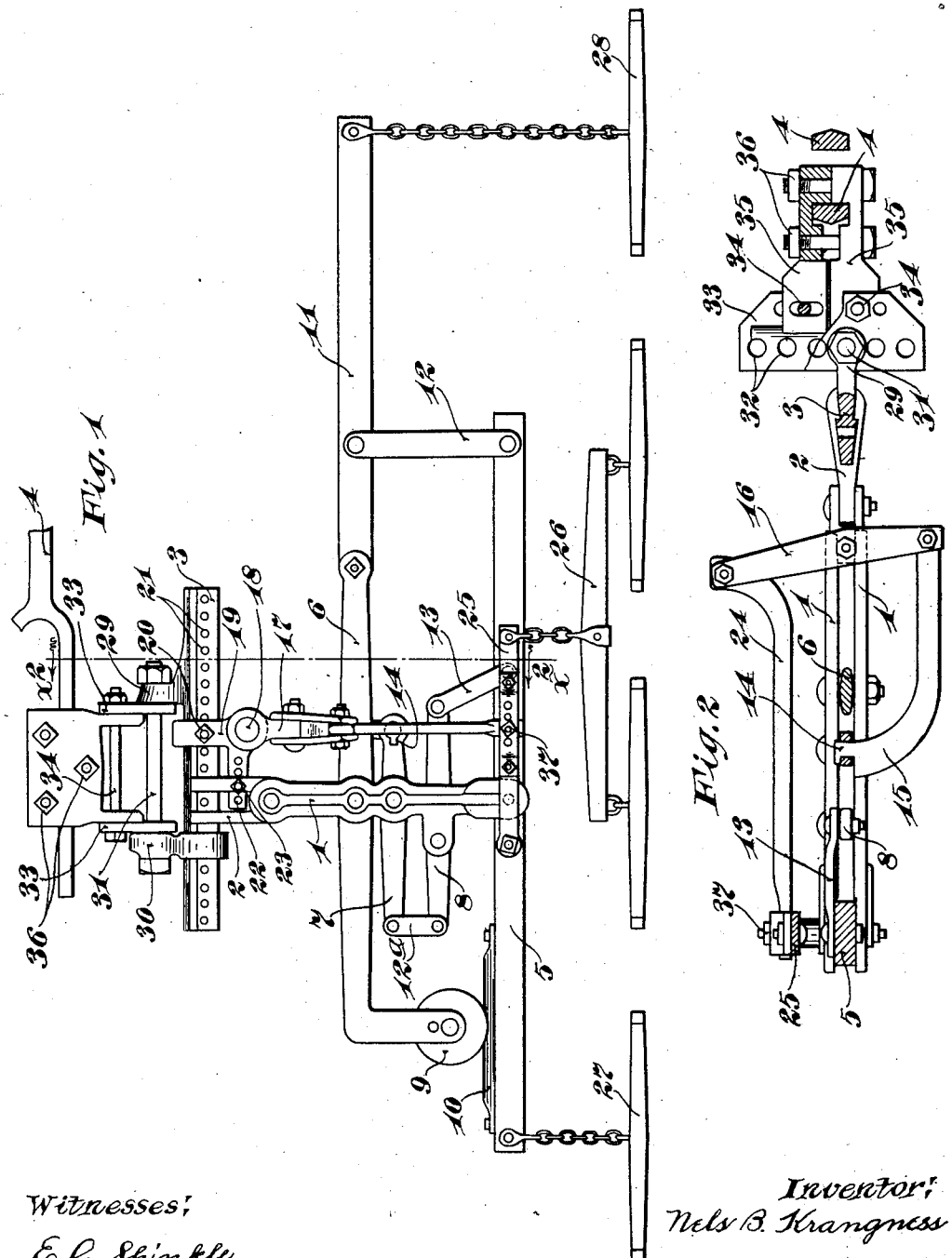
Witnesses:
E. C. Skinkle
Alice V. Swanson
Inventor:
Nels B. Krangness
By his Attorneys:
Williamson Merchant

UNITED STATES PATENT OFFICE.

NELS B. KRANGNESS, OF PORTER, MINNESOTA, ASSIGNOR OF ONE-HALF TO OSCAR MILLER, OF PORTER, MINNESOTA.

DRAFT-EQUALIZER.

1,037,930.   Specification of Letters Patent.   Patented Sept. 10, 1912.

Application filed October 27, 1909. Serial No. 524,787.

*To all whom it may concern:*

Be it known that I, NELS B. KRANGNESS, a citizen of the United States, residing at Porter, in the county of Yellow Medicine and State of Minnesota, have invented certain new and useful Improvements in Draft-Equalizers; and I do hereby declare the following to be a full, clear, and exact description of the invention, such as will enable others skilled in the art to which it appertains to make and use the same.

My invention has for its object to provide an improved draft equalizer, and, to this end, it consists of the novel devices and combinations of devices hereinafter described and defined in the claims.

In the drawings, the device is shown as designed as a four-horse equalizer adapted for the horses to be driven side by side, but the principles of construction involved therein may be incorporated in draft equalizers of different horse capacity.

In the accompanying drawings, which illustrate the invention in its preferred form, like characters indicate like parts throughout the several views.

Referring to the drawings, Figure 1 is a plan view, with some parts broken away, showing the improved draft equalizer; and Fig. 2 is a vertical section taken approximately on the line $x^2\ x^2$ of Fig. 1.

This improved equalizer is adapted for use in connection with different kinds of vehicles and portable machinery, such as wagons and harvesters, for example, but, as shown, it is especially designed and arranged for connection to sulky plows and gang plows with all the horses working abreast and with but one horse working in the furrow and the other horses on the "land" and with the draft strain equally distributed among the several horses.

Of the parts of the equalizer, the numeral 1 indicates a pair of parallel vertically spaced metallic body straps or brackets which, at their rear ends, are shown as pivotally connected to a bifurcated bearing 2 which, as shown, is secured for lateral adjustments on a transverse horizontal bar 3, which latter is preferably secured to the frame or draw bar 4 of the plow by an adjustable clevis hereinafter to be described. Intermediately pivoted to the front ends of the body straps 1 is a main equalizing lever 5 and intermediately pivoted to the intermediate portions of the said straps, at the rear of said main lever 5, is a relatively long rear lever 6 and two relatively short power multiplying levers 7 and 8. At its left hand end, as viewed in Fig. 1, the rear lever 6 has a forwardly extended end provided with a bearing wheel 9 that presses against a short rail 10 secured to the back of the main lever 5. An extension lever 11 is pivotally connected to the right hand end of the rear lever 6 and the intermediate portion of the said extension lever 11 is connected to the right hand end of the lever 5 by a link 12. The rear lever 6 is pivoted at its central portion, while the levers 7, and 8 are pivoted to one side of their centers so that one end of each thereof is approximately twice as long as the shorter end. The long end of the lever 7 is connected to the short end of the lever 8 by a link $12^a$. The long end of the lever 8 is connected by a link 13 to the main lever 5 at a point considerably to the right of the intermediate pivot of the said main lever. The short end of the lever 7 is pivotally connected preferably by a bayonet joint 14 to the upturned front end of a lower link 15, the rear end of which is pivoted to the lower end of an upright equalizing lever 16. The lever 16 is preferably made double with two laterally spaced straps and is intermediately pivoted, at a point below its longitudinal center, to a knuckle 17 which, in turn, is connected by a vertical pivot 18 to an approximately L-shaped bearing 19. The rearwardly extended arm of the bearing 19 embraces the heretofore noted bar 3 and is secured thereto for lateral adjustments by a short nutted bolt 20 passed therethrough and through longitudinally spaced perforations 21 in the said bar 3. The laterally extended arm of the bearing 19 is provided with longitudinally spaced perforations 22 and is adjustably secured to the bearing 2 by a short nutted bolt 23 passed therethrough and through one of the said perforations 22.

The upper end of the upright lever 16 is connected by an upper and relatively long link 24. The supplemental lever 25 is pivotally attached, at its left hand end, as viewed in Fig. 1, to the main lever 5 quite close to its intermediate pivot. This supplemental lever 25 is very short as compared with the main lever 5 and is preferably in the form of a metal strap or bar. To the free right hand end of the said supplemental lever 25, a two-horse evener 26 is attached, and to the free or outer ends of the levers 5 and 11, swingle trees 27 and 28, respectively, are attached. This arrangement of the double tree and swingle trees brings the four horses side by side.

The perforated bar 3, which constitutes a part of the improved clevis, is provided with one fixed lug 29 and with a laterally adjustable coöperating lug 30, and through these lugs a horizontal pivot bolt 31 is passed. Said bolt 31 is also passed through one or the other of vertically spaced perforations 32 formed in the pair of laterally spaced clevis plates 33, which latter, by a pair of nutted bolts 34, are rigidly but adjustably secured to a pair of anchor brackets 35. These anchor brackets 35 embrace a portion of the plow frame or draw bar 4 and are rigidly secured thereto, with freedom for lateral adjustments, by a plurality of clamping bolts 36.

By vertical adjustments of the perforated bar 3, in respect to the clevis plates 33, and by lateral adjustments of the bearings 2 and 19 on the said perforated bar, the equalizer may be set substantially for the proper line of draft, but, in some instances, greater lateral adjustment is desired, and this additional lateral adjustment may be had by movements of the anchor brackets 35 on the frame 4. Also, it will be noted that the two bearings 2 and 19 may be set different distances apart, and at this point it should also be noted that the front end of the upper link 24 is adjustably connected at 37 to the lever 25, so that the said link may be kept parallel to the body straps 1 throughout the various adjustments. As is evident, when the four horses are pulling on the two swingle trees and on the double tree, the wheel 9 of the rear lever 6 will be pressed against the rail 10 on the main lever 5, by the drawing strain of the horse hitched to the swingle tree 28 transmitted with the force of two to one through the levers 11 and 6. The said levers are so proportioned that the entire draft strain will be equalized between the four horses. The body straps 1 and the links 15 and 24 are free for parallel lateral swinging movements, so that the evener is free for limited movements transversely of the lines of draft strain.

The efficiency of the equalizer above described has been demonstrated in actual practice.

What I claim is:

1. In a draft equalizer, the combination with a bracket, of a main lever and a rear lever, both of which are intermediately pivoted to said bracket, a bearing wheel secured to one end of said rear lever and acting on said main lever, a lever extension pivotally connected to the other end of said rear lever, links connecting said main lever and said lever extension, intermediate connections between said main and rear levers, and draft devices applied to said main lever and to said lever extension, substantially as described.

2. A connection for draft equalizers comprising an anchor bracket, a pair of laterally spaced clevis plates connected to said anchor bracket for vertical adjustments, a transversely horizontally extended bar connected to said clevis plates for vertical adjustment, a bifurcated bearing, the prongs of which are slidably mounted on said bar, means for holding said bifurcated bearing in different lateral adjustments with respect to said bar, and a draft device pivotally secured to said bifurcated bearing.

In testimony whereof I affix my signature in presence of two witnesses.

NELS B. KRANGNESS.

Witnesses:
O. G. OLSON,
ISAAC ANDERSON.

---

Copies of this patent may be obtained for five cents each, by addressing the "Commissioner of Patents, Washington, D. C."